May 29, 1934.  V. BUSH  1,960,694
TEMPERATURE CONTROL APPARATUS
Filed June 3, 1931  2 Sheets-Sheet 1
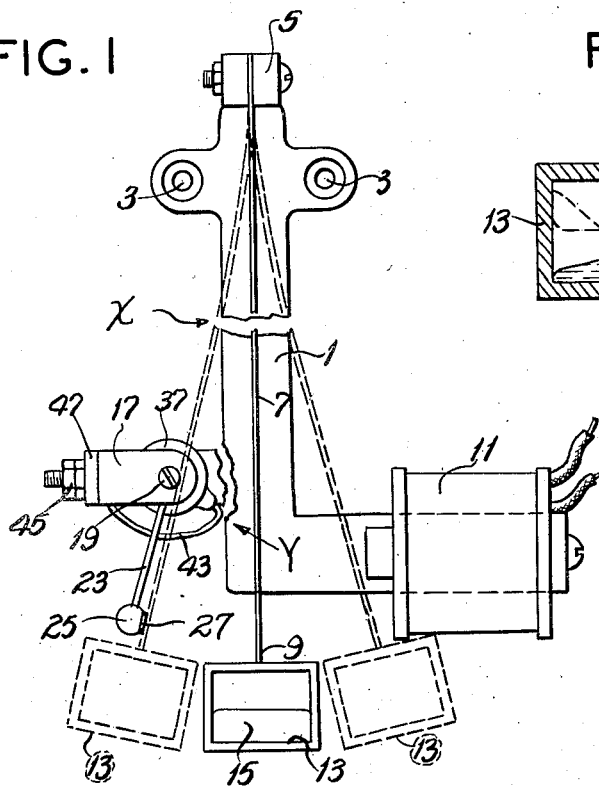
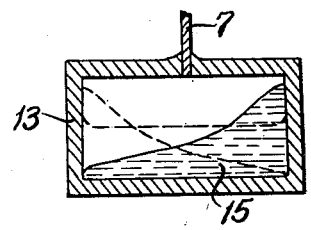
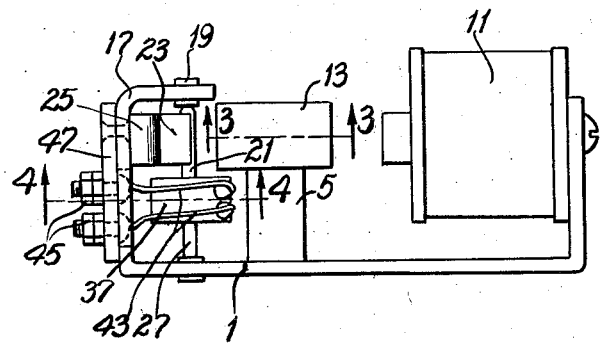
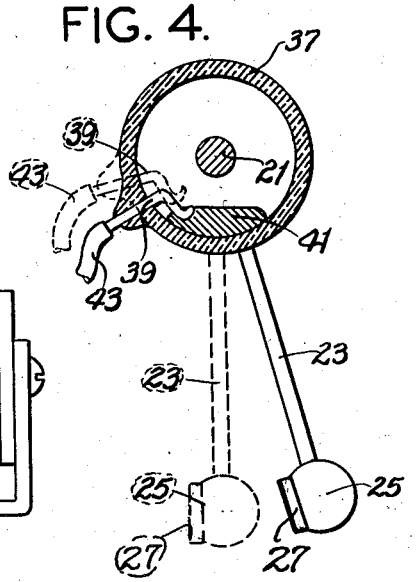
Vannevar Bush, Inventor,
Delos G. Haynes,
Attorney.

May 29, 1934.  V. BUSH  1,960,694
TEMPERATURE CONTROL APPARATUS
Filed June 3, 1931  2 Sheets-Sheet 2
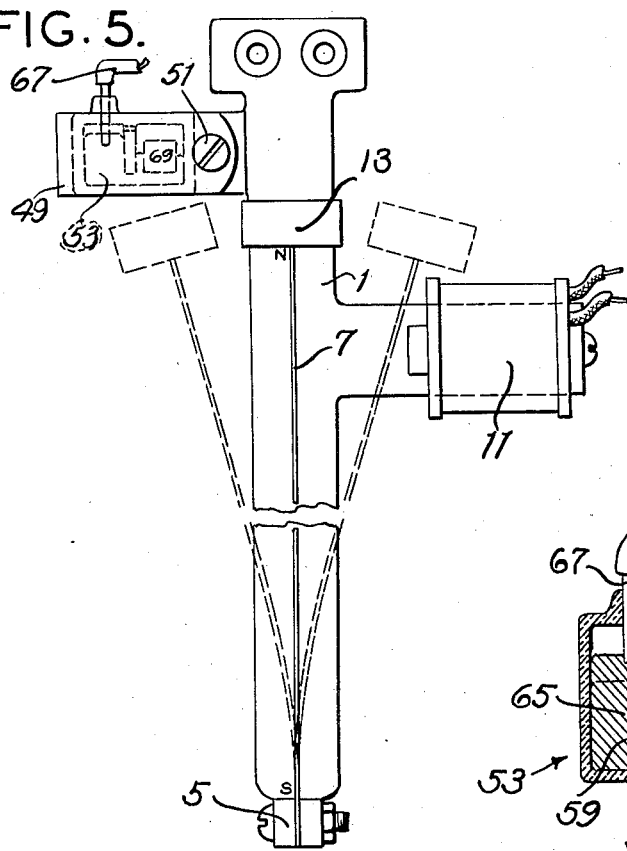
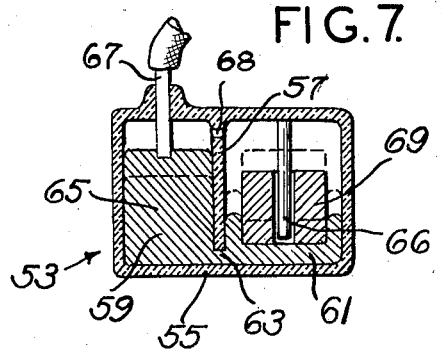
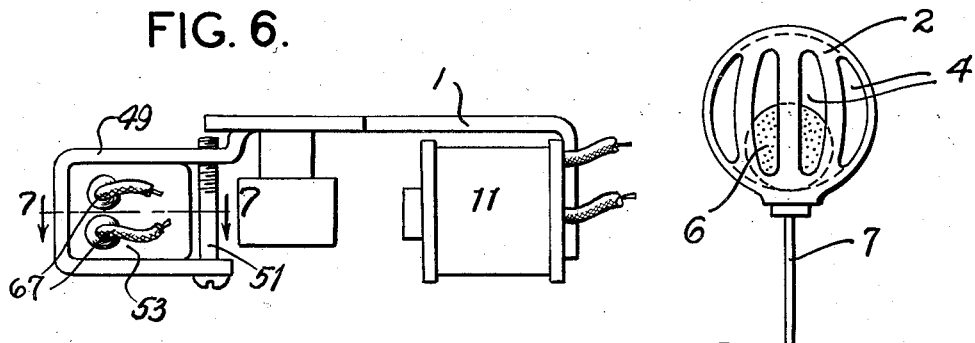

Patented May 29, 1934

1,960,694

UNITED STATES PATENT OFFICE 1,960,694

TEMPERATURE CONTROL APPARATUS

Vannevar Bush, Belmont, Mass., assignor to General Plate Company, Attleboro, Mass., a corporation of Massachusetts Application June 3, 1931, Serial No. 541,755

28 Claims. (Cl. 200—136)

This invention relates to temperature control apparatus, and with regard to certain more specific features, to thermostatic devices.

Among the several objects of the invention may be noted the provision of a thermostat of the class described which is critical and which responds to relatively slight temperature variations, the provision of a thermostat of the class described which is rugged and reliable in use, and which involves a minimum number of parts; and the provision of a thermostat of the class described which is adapted to be empowered by available electric current. Other objects will be in part obvious and in part pointed out hereinafter.

The invention accordingly comprises the elements and combinations of elements, features of construction, and arrangements of parts, which will be exemplified in the structure hereinafter described, and the scope of the application of which will be indicated in the following claims.

In the accompanying drawings in which are illustrated several of various possible embodiments of the invention, Fig. 1 is a front elevation of a thermostat embodying the invention;

Fig. 2 is a bottom plan view of the thermostat of Fig. 1;

Fig. 3 is a vertical section taken substantially on line 3—3 of Fig. 2;

Fig. 4 is a vertical section taken substantially on line 4—4 of Fig. 2;

Fig. 5 is a front elevation of a second embodiment of the invention;

Fig. 6 is a top plan view of the thermostat shown in Fig. 5;

Fig. 7 is a vertical section taken substantially on line 7—7 of Fig. 6; and,

Fig. 8 is a view illustrating an alternative.

Similar reference characters indicate corresponding parts throughout the several views of the drawings.

In the thermostatic art, I have found that the criterion for closeness of temperature control and positive action is that the energy which is to operate a switch or the like should come from an internal source and not be produced by the direct effect of temperature upon the thermostatic materials or otherwise and an unduly large amount of material is necessary in the thermostatic element per se. By proper construction, as exemplified by snap-acting discs and the like, much can be accomplished to reduce the amount of material required. However, the apparatus herein described has the advantage over said prior apparatus in that a thermostatic unit is constructed which will operate with a negligible temperature differential. This differential is smaller than that which is inherent in the prior devices. For instance, my device will operate with a temperature differential of the order of 0.01° F.; whereas a snap-acting, disc type of thermostat will have a temperature differential of the order of 0.5° F. Furthermore, my device is rugged and reliable.

The present invention achieves its criticalness of control through the use of a crystalline salt or the like which has a definite reproducible melting point and preferably a low latent heat of fusion. Numerous salts both organic and inorganic are available in which the melting point temperature is accurately established to a magnitude of one one-hundredth of a centigrade degree. In small quantities, the heat of fusion of most salts is low.

Referring now more particularly to Fig. 1, there is illustrated at numeral 1 a frame provided with mounting holes 3. Supported at one end of the frame 1 by a customary form of clamping device 5 is a reed or spring 7. The reed 7 is preferably formed of steel; and permanently magnetized. The end 9 of the reed 7 not secured by the clamp 5 is free to vibrate as will be described hereinafter.

Also mounted on the frame 1, in an appropriate position to react upon the reed 7, is a small electromagnet 11, energized from any suitable source of alternating current.

It is evident that if the natural frequency of the reed 7 (say, for example, 60 cycles per second) and the frequency of the alternating current source energizing the magnet 11 (such as a 60 cycle source) are the same, the reed will vibrate through a wide amplitude when the magnet 11 is energized, as the reeds of frequency indicators used in alternating current measurements vibrate.

Secured on the free end 9 of the reed 7 is a small chamber 13 partially filled with a solid salt 15, having the characteristics above described. It is desirable that the quantity of salt 15 and the size of the chamber 13 be kept as small as possible.

At a temperature lower than the melting point of the salt 15, said salt 15 remains in solid, fixed position and does not have any changing effect upon the vibration of the reed 7. However, when the exterior temperature rises to the melting point of the salt 15, said salt quickly melts, and forms a liquid in the container 13. The liquid salt in the container 13 then moves back and forth as the reed vibrates. The movement of the liquid salt produces a varying effect on the vibrating reed, the result of which is a substantially instantaneous damping of the vibration of the reed 7 with an appreciable decrease in the amplitude of vibration. The initial changing contour of the body of the liquid salt in the container 13 as it moves from side to side is indicated in Fig. 3. The fused salt is shaken violently in the container as soon as the salt fuses and then it subsides at the lower amplitude of vibration until changes of position are less.

Experiment proves that with a reed about 2½″ long and a chamber about ¼″ in diameter containing calcium chloride, the amplitude decreases from about ¾″ below the critical temperature to about $\frac{1}{32}$″ above the critical temperature.

To recapitulate, the device as thus far described comprises a vibrating reed and means for changing the amplitude of its vibration in response to temperature variations. Various modifications of the invention are occasioned in the various manners in which this change of amplitude is utilized to effect a control. The control most often desired is the making and breaking of an electrical circuit. This description is accordingly directed to exemplary embodiments in which the changing amplitude is caused to make and break an electric circuit, although it is to be understood that the invention includes the operation of other types of controls.

Figs. 1 to 4 illustrate one structure by which control of an electrical circuit is achieved. Referring more particularly to Figs. 1 and 2, numeral 17 indicates a U-shaped extension of the frame 1. The extension 17 carries therein bearings 19, which are provided with suitable depressions to receive the pointed ends of a shaft 21. The bearings 19 are adjusted so that the shaft 21 is free to rotate with substantially no friction, as in the case of the staffs in clock work mechanisms. The shaft 21 is preferably positioned relative to the reed 7 so that said reed 7, even when vibrating in its greatest amplitude, does not hit said shaft 21.

Supported on the shaft 21 in the plane of the vibrating reed 7 is a pendulum 23 having a weighted end 25. The pendulum 23 hangs normally, at rest, directly in the path of the reed 7 as it vibrates in its large amplitude. The reed 7 thus pushes the pendulum 23 to one side when it is vibrating without the damping effect of the salt 15. When the reed 7, however, is vibrating in its lesser amplitude, as when it is damped by the liquefied salt 15, the pendulum 23 hangs at rest, out of the range of the reed (see dotted lines, Fig. 4).

With the weight 25 of sufficient size, the pendulum 23 has sufficient moment of inertia so that, under the exemplary 60-cycle vibrations in wide amplitude of the reed 7, it remains substantially uniformly in its unstable position. To enhance this result, the weight 25 is provided with a felt pad 27, whereby a steady action is obtained.

The shaft 21 thus is operated to integrate or translate the vibrations of the reed 7. That is, for wide amplitude vibration, the shaft 21 has one relatively stable angular position, while for slight amplitude vibration, said shaft has a second stable position. The transition between positions is rapid and substantially instantaneous as the amplitude of vibration of the reed 7 changes.

It will be understood that the switch, although being shown in Fig. 1 as mounted towards the lower end of the reed 7, is in fact mounted higher with respect thereto, as indicated by the broken lines X. That is to say, the arm 23 is mounted somewhat near the mid position of the reed 7. As indicated by the broken lines Y, the switch may be positioned closer or farther away from the reed 7 when said reed is in its vertical position. It will be understood that this matter of positioning the switch is a matter of design, depending upon the application to which the device is to be put.

Another point to be noted is that the natural period of the switch should be large as compared to the period of the alternating current. This can be accomplished either by giving the switch a large moment of inertia or by giving it a small restoring force. It is perhaps better to choose the latter method, as is intended herein. Hence there is removed the friction attending the use of a heavy switch. Therefore with a small switch a high period may be obtained.

The translatory movement of the shaft 21 may be advantageously used in a number of ways to achieve the making and breaking of electrical circuits. I prefer to utilize a rotating mercury switch mounted directly on the shaft 21. This switch, illustrated in Figs. 1, 2 and 4, comprises a circular cylindrical chamber 37, mounted on the shaft 21 so that said shaft is in the position of the axis of the cylinder. Electrical contacts 39 are sealed into the walls of the chamber 37, in position to dip into and emerge from a pool of mercury 41. The chamber 37 is preferably filled with an arc-quenching gas and then hermetically sealed. Flexible pigtail leads 43 connect the contacts 39 to electrical terminals 45 on an insulating panel 47 supported by the frame 1.

The advantage of this type of switch is the minimum of work required to rotate it to make and break contacts. The minimized work expenditure is highly advantageous with the present invention, as the energy supplied by the vibrating reed 7 is not considerable.

It will be seen that by suitable location of the contacts 39 in the chamber 37, connections through the pool of mercury may be effected by rotating the shaft 21 to its wide amplitude position, and correlatively, connections are broken when the shaft 21 returns to slight amplitude position. A reverse effect (wide amplitude, connections broken; slight amplitude, connections made) may be readily obtained by moving the contacts 39 through 180 degrees to the other side of the chamber 37.

Thus a mechanical control device is provided to translate the varying vibrational amplitude of the reed 7 into a definitive, useful control action.

Figs. 5 to 7 illustrate an alternative form of control associated with a similar vibrating reed. In this embodiment the reed 7 is mounted with its free end up, instead of down as in the Figs. 1-4 form. It is to be understood that the present invention includes reeds mounted in any suitable position, and that the reed of the Figs. 1-4 embodiment might also be mounted in the manner of the Fig. 5 embodiment.

In Fig. 4, the frame 1, magnet 11, reed mounting 5, and salt chamber 13 are all similar to the corresponding elements in Fig. 1, and accordingly require no redescription. A U-shaped extension 49 is formed on the upper end of the frame 1, and is provided with a bolt 51 whereby a mercury switch 53 may be clamped in position.

The switch 53 is positioned so that it is near to, but clears, the end of the vibrating reed 7.

The switch 53 is illustrated in more detail in Fig. 7, where it will be seen to comprise a container of insulating material 55 (such as glass) having a partition 57 dividing it into two chambers 59 and 61. A relatively small opening 63 permits communication between the two chambers. Mercury 65 or other suitable conducting liquid is introduced into the container 55 and flows in a somewhat restricted manner through the opening 63 to equalize its static head in the chambers 59 and 61. An opening 68 permits equalization of gas pressure. In the top of chamber 59 a pair of electrical contacts 67 are sealed, and extend downwardly to immerse in the mercury 65 under conditions to be described hereinafter and thereby to be electrically connected. A permanently magnetized bar 69 floats on the surface of the mercury in chamber 61 guided by a guy rod 66 passing through a hole therein. The container 55 is either evacuated or filled with an arc-quenching gas, and then hermetically sealed.

Under normal, static conditions the mercury 65 is balanced in the chambers 59 and 61 so that the contacts in chamber 59 are not immersed; that is, no electrical connection is made. These conditions obtain when the reed 7 is not vibrating, or is vibrating in its damped, slight amplitude. When the reed 7 vibrates in large magnitude, the end thereof, being of a certain magnetic polarity (for example, North) is intermittently brought beneath the chamber 61, in such rapidity that a magnetic field is established which draws down the opposite polarity, under side (South) of the floating bar 69. As the bar 69 is pulled downwardly, it forces mercury into the chamber 59 until the surface thereof connects the contacts 67 and thereby completes an electrical circuit.

The rapidity with which the magnetized end of the vibrating reed is brought beneath the floating bar 69 is of such a degree that the natural inertia of the bar 69 prevents it from rising between vibrations, thus preventing intermittent making and breaking of the contacts. This inertia effect is enhanced by the frictional resistance to the flow of the mercury 65 through the opening 63.

When the melting of the salt in the chamber 13 causes the amplitude of vibration of the reed 7 to decrease, it will be seen that the magnetized end of said reed is no longer brought beneath the floating bar 69, and, accordingly, the bar returns or rises to its normal static condition and the electrical contact is broken. This breaking of the electrical contact occurs substantially instantaneously when the amplitude of vibration diminishes.

It is thus seen that a second, magnetic means is provided, whereby the changing amplitude of the vibrating reed 7 is made to effect a control.

It is to be noted that numerous other forms of controls may be employed with the vibrating reed 7, and that the two forms hereinbefore disclosed are by way of example only.

Adjustment of the temperature at which the thermostat as a whole operates may be effected without replacing the particular salt 15 by choosing a salt having its melting point well above the temperature range in which it is desired to effect the control. Under these circumstances, an auxiliary heating element (such as an electrical resistance) is preferably placed below the reed. The auxiliary heating element is preferably controllable to liberate varying amounts of heat. Control, for example, may be achieved through the use of a rheostat. Or, the auxiliary heating element may be fixed in adjustment and an adjustable deflecting vane or the like may be introduced between the element and the thermostat.

With an auxiliary heating element of any of the types above described, it will be seen that a means is provided for adding an adjustable temperature difference over the ambient temperature. Critical conditions will be secured when the sum of the ambient temperature and the added temperature is equal to the melting point of the salt. Accordingly, by varying the added temperature, a varying control of the ambient temperature is secured.

The details of auxiliary heating element control, described broadly hereinbefore, are disclosed and claimed in the copending application of the present inventor and John A. Spencer, Serial No. 529,426, filed April 11, 1931, and patented October 18, 1933, with the Number 1,883,251.

It will be understood that insofar as the drawings show the amplitude of vibration of reed 7 they are diagrammatic, and that the actual amplitude may be other than that shown. It should also be understood that the principles herein set forth may be embodied in similar apparatus in which advantage is taken of the heat of vaporization of a substance, thus converting it from a liquid to a gas or vapor and hence obtaining a change of period in the vibration of the system to which it is attached, according to predetermined temperature change. Thus any change of state may be made use of. For instance, a liquid such mercury would damp vibrations in the liquid stage and permit vibrations of great amplitude in the vapor state. This change in vibration as a result of change of state could be translated into mechanical action as shown hereinbefore. In this invention it is also well to know that a given substance such as salt could first be melted and subsequently vaporized with the result that in the solid stage the amplitude of vibration would be relatively great, in the liquid stage it would be smaller and in the final vapor stage again greater. The initial and final vibrations would be different. Another modification could be made by using a salt such as mercuric chloride which sublimates or passes directly from the solid to the gaseous state.

In Fig. 8 is shown a modification in which a cage having reticulations 4 is mounted on the reed 7 instead of the chamber 13. In this cage 2 is placed a mass 6 of vulcanized rubber (pure rubber gum). In the presence of gasoline vapor this mass 6 absorbs gasoline and becomes slightly viscous. The resulting internal friction damps the vibration of the reed 7, and thus gives a warning signal of the pressure of the vapor. It is to be understood that the apparatus is set in the region of the generation of the vapor. The action is reversible, as is the case with the other forms described. It will be noted that the change in weight of the rubber aids in detuning the reed, as well as the friction due to viscosity.

It will be understood that the reed is representative of any vibrating mechanical system which may be used.

From the above it will be seen that the invention is directed to a vibrating system having a natural period which is an integral multiple of the period of that which vibrates the system with means susceptible of a change of state in response to a change in ambient conditions, whereby alterations of damping of the system are effected.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostat including a vibrating reed, and means for altering the amplitude of vibration of said reed according to temperature changes.

2. A thermostat including a vibrating reed, a chamber mounted on the free end of said reed, and a salt in said chamber.

3. A thermostat including a vibrating reed, a chamber mounted on the free end of said reed, and a salt in said chamber, said salt having a well-defined, reproducible melting point.

4. A thermostat comprising a vibrating reed, means for changing the amplitude of vibration of said reed in accordance with temperature conditions, and means adapted to translate the changing amplitude of vibration of said reed into a control.

5. A thermostat comprising a reed, and means adapted to cause vibration of said reed through a relatively wide amplitude at temperature below a predetermined temperature, and for causing said reed to vibrate through a relatively slight amplitude at temperature above said predetermined temperature.

6. A thermostat comprising a reed, and means adapted to cause vibration of said reed through a relatively wide amplitude at temperature below a predetermined temperature, and for causing said reed to vibrate through a relatively slight amplitude at temperature above said predetermined temperature, and means cooperating with said vibrating reed adapted to control an electrical circuit according to the relative amplitude of vibration of said reed.

7. A thermostat comprising a reed, and means adapted to cause vibration of said reed through a relatively wide amplitude at temperature below a predetermined temperature, and for causing said reed to vibrate through a relatively slight amplitude at temperature above said predetermined temperature, and means cooperating with said vibrating reed adapted to control an electrical circuit according to the relative amplitude of vibration of said reed, said last named means comprising a device adapted to be held in one position by inertia when the reed is vibrating in said large amplitude, and to assume a second position when said reed is vibrating in said slight amplitude.

8. A thermostat comprising a reed adapted to vibrate in varying amplitudes according to the ambient temperature, and means associated with said reed for controlling an electrical circuit according to the relative amplitude of vibration of said reed.

9. A thermostat comprising a reed adapted to vibrate in varying amplitudes according to the ambient temperature, and means associated with said reed for controlling an electrical circuit according to the relative amplitude of vibration of said reed, said last named means comprising a device adapted to be held in one position by inertia when said reed is vibrating in a relatively large amplitude and to assume a second position when said reed is vibrating in a relatively smaller amplitude.

10. A thermostat comprising a reed adapted to vibrate in varying amplitudes according to the ambient temperature, and means associated with said reed for controlling an electrical circuit according to the relative amplitude of vibration of said reed, said last named means comprising a pendulum intersecting the vibrating path of said reed, adapted to be struck by said reed when said reed is vibrating in a relatively large amplitude, but failing of engagement with said reed when said reed is vibrating in a relatively smaller amplitude.

11. A thermostat comprising a reed adapted to vibrate in varying amplitudes according to the ambient temperature, and means associated with said reed for controlling an electrical circuit according to the relative amplitude of vibration of said reed, said last named means comprising a shaft, a pendulum depending from said shaft, said pendulum being positioned in the path of the vibration of said reed, whereby said pendulum is thrust to one side by said reed when said reed is vibrating in a relatively large amplitude, said pendulum also being positioned so that it does not engage said reed when said reed is vibrating in a relatively smaller amplitude, and an electrical switch associated with said shaft adapted to make and break electric connections according to the positon of said pendulum.

12. A thermostat comprising a frame, a magnetized reed supported at one end on said frame, and an electromagnet supported on said frame adapted to actuate said reed to vibrate, and means on the free end of said reed adapted to control the amplitude of the vibration of said reed according to the ambient temperature.

13. A thermostat comprising a frame, a magnetized reed supported at one end on said frame, and an electromagnet supported on said frame adapted to actuate said reed to vibrate, and means on the free end of said reed adapted to control the amplitude of the vibration of said reed according to the ambient temperature, said last named means comprising a chamber partilly filled with a salt having a definite, reproducible melting point.

14. A thermostat comprising a frame, a magnetized reed supported at one end on said frame, and an electromagnet supported on said frame adapted to actuate said reed to vibrate, and means on the free end of said reed adapted to control the amplitude of the vibration of said reed according to the ambient temperature, and a switch supported on said frame in proximity to the free end of said reed, said switch being adapted to control an electrical circuit according to the relative amplitude of the vibration of said reed.

15. A thermostat comprising a frame, a magnetized reed supported at one end on said frame, and an electromagnet supported on said frame adapted to actuate said reed to vibrate, and means on the free end of said reed adapted to control the amplitude of the vibration of said reed according to the ambient temperature, and a switch supported on said frame in proximity to the free end of said reed, said switch being adapted to control an electrical circuit according to the relative amplitude of the vibration of said reed, said switch comprising a container divided into two communicating chambers, mercury in said chambers, a magnetized bar floating in said mercury in one of said chambers, and a pair of electrical contacts in the other of said chambers adapted to be connected by said mercury.

16. A thermostat including as an element thereof a vibrating reed, and means associated with the reed whereby the amplitude of vibration of said reed is a function of the ambient temperature.

17. A thermostat including a vibration reed, a chamber mounted on the free end of said reed, and a material in said chamber, said material having a well-defined, reproducible change of state point.

18. A thermostat comprising a vibrating system adapted to produce a predetermined effect, a mass associated with said system, said mass having a definite change of state point responsive to temperature change, said mass being adapted upon change of state to change the period of vibration of said system to change said effect.

19. A thermostat comprising an alternating current magnet, a vibrating mechanical system having a natural period which is an integral multiple of the period of said alternating current, said system being located in the field of said magnet and maintained in elevation thereby, and means associated with said mechanical system and susceptible of a change of state in response to a change in ambient temperature, thereby altering the damping of said mechanical system and its amplitude of vibration.

20. In apparatus of the class described a vibrating system, means for vibrating said system, said vibration system having a natural period which is an integral multiple of the period of that which vibrates the system and means associated with said system susceptible of a change of state in response to a change in ambient conditions, thereby altering the damping of said system.

21. In a control, a vibrating reed, and means translating the vibrations of the reed, according to their amplitude, into a uniform, non-intermittent control.

22. In a control, a vibrating reed, the amplitude of vibration whereof changes, and means translating the amplitude of vibration into a control, said means having a lag such that it does not move to follow each of the individual vibrations of said reed.

23. In a control, a vibrating reed, the amplitude of vibration whereof changes, and control means susceptible to the amplitude of vibration of said reed, said control means being actuated to one position when said reed is vibrating in one amplitude and to another position when said reed is vibrating in another amplitude, said means, nevertheless, not shifting positions with the individual vibrations of said reed but only with the change of amplitude of vibration thereof.

24. In a control, a vibrating reed, the amplitude of vibration whereof changes, and a pendulum positioned to be impacted by said reed when vibrating in its relatively greater amplitude, but to be free from impact by said reed when vibrating in its relatively lesser amplitude.

25. In a control, a vibrating reed, the amplitude of vibration whereof changes, and a pendulum positioned to be impacted by said reed when vibrating in its relatively greater amplitude, but to be free from impact by said reed when vibrating in its relatively lesser amplitude, said pendulum having a moment of inertia such that it does not move to follow each of the individual vibrations of said reed.

26. In a control, a vibrating reed, the amplitude of vibration whereof changes, and a pendulum positioned to be impacted by said reed when vibrating in its relatively greater amplitude, but to be free from impact by said reed when vibrating in its relatively lesser amplitude, said pendulum having a moment of inertia such that it does not move to follow each of the individual vibrations of said reed, and controlling means mounted upon the rotating axis of said pendulum, said controlling means being actuated by the rotation of said pendulum axis as said pendulum is impacted by said reed.

27. In a control, a vibrating reed, the amplitude of vibration whereof changes, and a pendulum positioned to be impacted by said reed when vibrating in its relatively greater amplitude, but to be free from impact by said reed when vibrating in its relatively lesser amplitude, said pendulum having a moment of inertia such that it does not move to follow each of the individual vibrations of said reed, and a rotatory mercoid switch mounted upon the rotating axis of said pendulum, said switch thereby being adapted to establish one condition of circuit control when said reed is vibrating in one amplitude and another condition of circuit control when said reed is vibrating in another amplitude.

28. In a control, a vibrating reed, the amplitude of vibration whereof changes, said reed being magnetized, a frame supporting said reed, and a switch supported on said frame in proximity to the vibrating end of said reed, said switch being adapted to control an electrical circuit according to the relative amplitude of vibration of said reed, said switch comprising a container divided into two communicating chambers, mercury in said chambers, a magnetized bar floating in the mercury in one of said chambers, and at least one contact normally not touching mercury in the other chamber, said magnetized bar being acted upon by said magnetized reed when vibrating in its relatively larger amplitude, to force mercury from its chamber into the other chamber to bring said mercury into electrical connection with said contact to complete the said electrical sircuit.

VANNEVAR BUSH.